United States Patent Office 3,540,313
Patented Nov. 17, 1970

3,540,313
COMBINED GEAR-CHANGE AND STARTER SWITCH CONTROL DEVICES
Jean Maurice and Martial Lavarec, Billancourt, France, assignors to Regie Nationale des Usines Renault, Billancourt, France, and Automobiles Peugeot, Paris, France
Filed Feb. 5, 1969, Ser. No. 796,825
Claims priority, application France, Feb. 9, 1968, 139,318
Int. Cl. B60k *27/08;* F02n *15/10*
U.S. Cl. 74—850                      8 Claims

ABSTRACT OF THE DISCLOSURE

Combined gear-change and starter switch control for automotive vehicles comprising a sliding and rotary control rod actuated by means of the gear lever and rigid with a selector grid having the shape of a cylindrical sector which has formed in each face axial peripheral recesses corresponding to the different positions of the gear lever and constituting two profiles movable between a pair of fixed guide studs; a deeper recess engaged at its inlet end by one of said studs in the neutral lever position permits exerting a transitory action on a starter switch through the medium of a push member rigid with said control rod.

---

This invention relates to devices combining change-speed control means with a starter switch in an automotive vehicle, more particularly an automotive vehicle equipped with an automatic gear-change transmission.

To prevent the driver from making faulty maneuvers when starting the engine, which starting must take place under the requisite safety conditions (either in the neutral (N) or parking (P) position), various devices have already been proposed; in some of these devices the driver must move the gear change selector lever to one of these N or P positions before actuating the starter motor by means of a switch; besides, other devices have been proposed wherein the engine is started by means of a lever in the neutral position in which a pin, stud or the like engages a grove preventing the energization of the starter motor in all the other lever positions.

However, these various devices are objectionable either in that they compel the driver to perform a series of different control movements, for example restoring the control lever to neutral or parking position and subsequently actuating the starter switch by depressing a separate button or rotating a key, or, when the engine is started by means of the same lever, in that they provide only one starting position (as a rule at the end of the selector grid, so that the driver must compulsorily move the lever throughout the steps thereof). The combination of a starter switch with a selector grid according to this invention provides a simple, efficient and reliable solution to the problem of starting the engine in either neutral or parking positions while ensuring a highly simplified operation when selecting the various other positions required for driving the vehicle.

More generally, this invention is applicable to devices for controlling the change-speed mechanism and the starting motor of automotive vehicles, which devices comprise as a rule a control rod adapted to slide and rotate about its axis in a fixed bearing, this control rod having one end operatively connected to a two-armed gear-change manual control lever, and a starter switch consisting of a transitory-action switch of which the control member keeps the contact open by means of a first spring. This device is characterized according to the present invention by the fact that said one end of the control lever, which is tubular, is engaged over a fixed guide rod engaging the end of one arm of said lever. This arm is fulcrumed externally to said tubular end by means of a pivot pin extending normally to said rod. A selector grid in the form of a cylindrical sector, rigid with and coaxial to said control rod, has peripheral axial recesses formed therein which correspond to the different lever positions, said recesses being formed in each one of its two faces, respectively, and constituting a first profile and a second profile adapted to move, as a function of the movement of said control rod, between on the one hand a first fixed guide stud against which a second spring weaker than said first spring urges said first profile, and on the other hand a second fixed guide stud. In said first profile the recess engaged by said first stud when the control lever is in the neutral position is extended towards the second profile by a peripheral axial groove, and a thrust member rigid with said control rod, which has an angular position such, ahead of said first profile, that it registers with the switch control member and can actuate this member during an axial movement of said control rod which is attended by the engagement of said groove by said first stud.

The second spring advantageously consists of a compression spring prestressed within the aforesaid tubular end, between the end of the fixed guide rod and a thrust member solid with the control rod. In this case the grid face comprising said second profile is directed towards said tubular end.

In order to enable the driver to start the engine also when the gear lever is in position P (parking; or parking brake applied), another recess of said first profile, which corresponds to this position of the control lever, is also provided with a groove extension adapted to receive said first pin when another thrust member also rigid with said control rod registers with the switch control member.

The aforesaid thrust members may also be formed directly either on the grid face comprising said first profile or on a separate member mounted on the control rod.

The arrangement according to this invention is attended by the following advantageous features:

(a) Instead of actuating the gear-change or selector lever and a starter switch or key, the driver actuates only the selector lever;

(b) Two engine starting positions, i.e. the neutral (N) and parking (P) positions, are available instead of a single position as in conventional arrangements designed for starting the engine by means of the gear-change lever;

(c) A high degree of safety is obtained since the starter switch can only be operated in the P and N positions. To actuate the starter switch, the selection is obtained by pushing (translation) in contrast with all the other selection movements and along an axis perpendicular to the planes of rotation of the lever when the latter is moved from one position to another, and the grid provides an abutment at the end of each actuation, thus preventing the driver from inadvertently skipping a position;

(d) The gear lever is easy to move, whether for starting the engine or selecting gears;

(e) The device is characterized by a very fast lever actuation since the re-starting (or the starting) is obtained by moving the gear lever and the two starting positions available will spare the driver the hitherto tedious necessity of moving the lever through the full range of the grid steps for simply starting the engine;

(f) The construction is extremely simple, since it permits notably of partially utilizing an existing control system of a mechanical transmission.

The invention will now be described by means of exemplary forms of embodiment illustrated diagrammatically in the attached drawings, in which.

Figure 1:
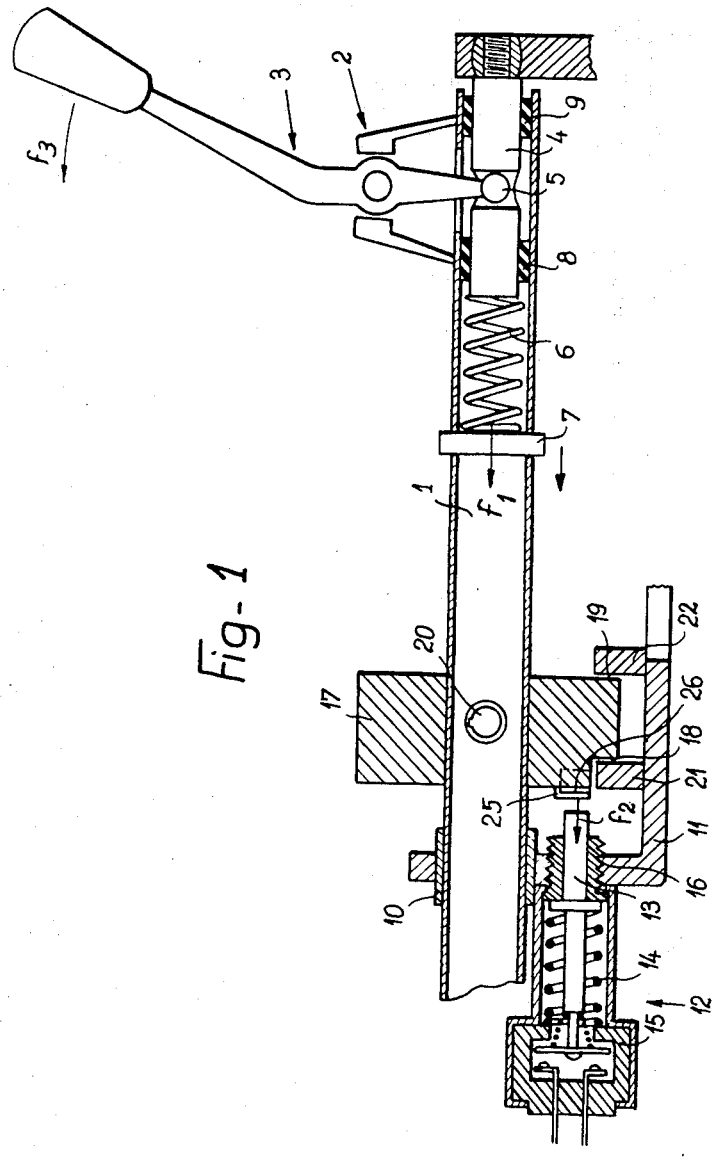
FIG. 1 is a longitudinal section of the device.

As shown in FIG. 1 the change-speed control rod consists of a tubular member 1 carrying, or rigid with, a bearing 2 in which the two-armed gear lever 3 is pivotally mounted. One arm of gear lever 3 is disposed externally, and the other internally, of the device. The internal arm of lever 3 has a spherical end 5 engaging a radial bore formed in a stationary guide rod 4. The tubular member 1 is normally urged to the left, as seen in the figure, by a coil compression spring 6 bearing with one end against said guide rod 4 and with the other end against a diametral pin 7 rigid with the tubular member.

The tubular member 1 is guided by a pair of bearings 8 and 9 on rod 4 and by another bearing 10 in a bracket or like support 11 carrying the switch 12 for energizing the starter motor (not shown) via a switch control member 13. The length $a$ of the external lever arm is about three times the length $b$ of the internal arm so that the effort to be exerted on the gear lever for producing the various maneuvers is reduced by the same ratio.

The starter switch 12 is adapted to energize the starter motor when the effort $f_2$ exerted on the push member 13 is sufficient for compressing the switch spring 14 prestressed by the end piece 15.

The starter switch is screwed in bracket 11 by means of a screw threaded portion 16.

Figure 2:
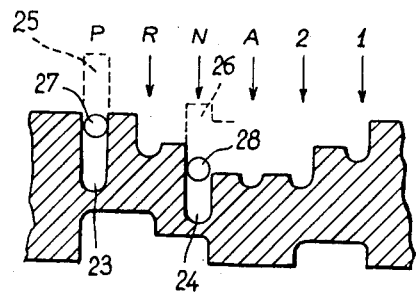
FIGS. 2 to 4 are developed views showing different grid profiles suitable for carrying out this invention.
Figure 3:
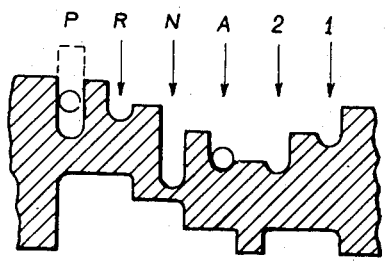

The gear selector grid 17 having substantially the shape of a cylindrical sector consists geometrically of two profiles 18 and 19 of which the developed view is illustrated in FIGS. 2 and 3, respectively; this sector may advantageously consist of moulded plastic or sintered metal and manufactured by any suitable and known simple moulding process. The grid 17 rigidly secured to the tubular control member 1 by means of a diametral pin 20 is adapted to rotate about the axis of this member and also to move by translation along this axis. Both profiles 18 and 19 are movable between end studs or pins 21 and 22 secured to the aforesaid bracket 11. The relative spacing of these studs is such that the grid can move therebetween with a certain play, for example .02". The contour of the cam faces or profiles 18 and 19 is given by way of example only and comprises in the case illustrated six positions, i.e. P (parking), R (reverse), N (neutral), A (automatic), 2 (position preventing the engagement of the third or top gear) and 1 (position preventing both second and third gears, or intermediate and top gears).

When the driver refrains from actuating the lever 3 at positions other than P and N, the grid 17 is constantly urged against the stud 21 by the spring 6 housed in tubular member 1. When the change-speed lever 3 and grid 17 are in position P or N, this stud 21 engages the grooves 23 or 24, respectively, formed in the profile 18, and the thrust members 25 or 26 bear against the control member 13 of switch 12. The stud 21 is retained in position 27 or 28, for the effort $f_1$ exerted by spring 6 on push member 13 is lower than the prestress $f_2$ exerted by spring 14 on the starter switch.

When the driver actuates the control lever in the direction $f_3$ to positions N or P, one of the thrust members 25 or 26 depresses the push member 13 of starter switch 12.

It is clear that the mode of operation of the device is extremely simple. Assuming the gear lever to be in position P or N, the driver will start the engine by simply pushing this lever forwards with a force $$f_3 = (f_2 - f_1) \times \frac{a}{a+b}$$

When the lever is released the grid resumes its position 27 or 28 shown in FIG. 2.

Figure 4:
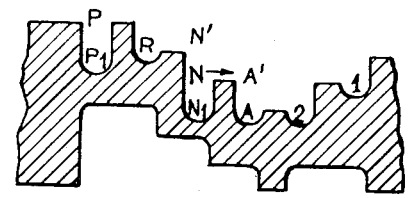

FIG. 4 illustrates all the possible positions of stud 21 in the grid shown in FIG. 3. The change from N to A is obtained either by means of a rotation from N to A' about the axis of the control rod, in the case of a grid of the type shown in FIG. 2, or by a rotation followed by a movement of translation in the case shown in FIG. 3. The translation from A' to A is accomplished by the force of return spring 6 which urges the grid against the stud 21. To change from N to R, the driver must firstly cause the lever to accomplish a movement of translation from N to N' and then a rotation from N' to R. This movement of translation, as well as all the other movements of translation necessary for changing the gear lever position by overcoming a resistance, takes place towards the steering wheel if the gear lever is disposed under the steering wheel. Of course the effort necessary for starting the engine takes place in the opposite direction. The other movements of translation not requiring any effort from the driver are produced by the spring 6.

Due to the particular configuration of the selector grid, the driver can actuate the gear lever with the maximum safety (whether in translation or rotation) for properly controlling the operation of the vehicle, since one of the studs 21 or 22 will abut against the grid at the end of each maneuver (in the case of the grid illustrated in FIG. 2). In the case of the grid illustrated in FIG. 3, the rotational abutment has been eliminated in order to simplify the maneuver (between positions N and 2) since there is no risk of shifting from N to 2, or conversely from 2 to N, without compulsorily stopping at A.

Figure 5:
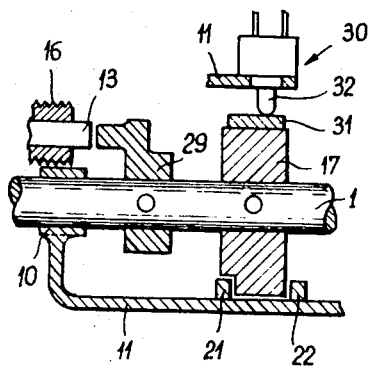
FIG. 5 is a fragmentary view showing a modified form of embodiment of the device shown in FIG. 1.

A backing light can easily be controlled in position R by providing on grid 17 a boss 31 adapted to actuate the button 32 of a switch 30 mounted on support 11 (FIG. 5). This switch may also be controlled by a boss formed on the lever 29, in case no sufficient space is available around the grid.

We claim:

1. Combined gear-change and starter switch device for automotive vehicles, which comprises a control rod adapted to slide and rotate in a fixed bearing and having one end connected to a two-armed gear-change lever, and a starter switch consisting of a transitory-action switch of which the control member is adapted to keep the contacts open under the action of a first spring, said end, which is tubular, being engaged on a fixed guide rod engaging in turn one end of one of the lever arms pivoted externally on said tubular end by means of a pivot pin disposed at right angles to said rod, a selector grid having substantially the shape of a cylindrical sector rigid with and coaxial to said control rod, said grid having formed on each one of its two faces a series of peripheral axial recesses corresponding to the different positions of said gear lever and constituting a first profile and a second profile both adapted to move as a function of the movement of said control rod between on the one hand a first fixed guide stud against which a second spring of a force weaker than the force of said first spring urges said first profile and, on the other hand, a second fixed guide stud, the recess in said first profile which is engaged by said first stud when said gear lever is in its neutral or parking position having an extension towards said second profile, said extension being in the form of an axial groove, and a thrust member rigid with said control rod has such an angular position, ahead of said first profile, that it registers with the switch control member and can actuate this member during an axial movement of said control rod which is attended by the engagement of said groove by said first stud.

2. Device according to claim 1, wherein the second spring is a compression spring prestressed in the tubular end aforesaid between the end of said fixed guide rod and an abutment element rigid with said control rod, the grid face which comprises said second profile being directed towards said tubular end.

3. Device according to claim 1, wherein the thrust member is provided on the grid face on which said first profile is formed.

4. Device according to claim 1, wherein said thrust member consists of a separate member mounted on said control rod.

5. Device according to claim 1, wherein another recess of said first profile, which corresponds to a "parking brake" position, is also provided with a groove-like extension adapted to receive said first stud when a second thrust member rigid with said control rod registers with said switch control member.

6. Device according to claim 1, wherein the two studs, the starter switch and the bearing are mounted on a common fixed support.

7. Device according to claim 1, wherein the operative coupling between the end of said lever arm and the fixed guide rod is obtained by means of a spherical portion formed at the end of said arm, which engages a cavity formed in said guide rod.

8. Device according to claim 1, wherein the switch of a backing light is so arranged that its control member lies on the path of a peripheral boss formed on said grid.

References Cited
UNITED STATES PATENTS

| | | | |
|---|---|---|---|
| 2,324,819 | 7/1943 | Butzbach | 123—179 X |
| 2,374,303 | 4/1945 | Osborne | 74—850 X |
| 2,647,178 | 7/1953 | Handy | 74—850 X |
| 2,661,730 | 12/1953 | Schneider et al. | 123—179 |
| 2,685,873 | 8/1954 | Cooke | 74—850 X |
| 3,035,563 | 5/1962 | Strauss | 74—850 X |

OTHER REFERENCES

German printed application 1,159,277, Dec. 12, 1963.

MARK NEWMAN, Primary Examiner

T. C. PERRY, Assistant Examiner

U.S. Cl. X.R.

123—179